UNITED STATES PATENT OFFICE.

HENRY ZIEGLER, OF BASLE, SWITZERLAND, ASSIGNOR TO THE BADISCHE ANILIN AND SODAFABRIK, OF MANNHEIM, GERMANY.

COLORING-MATTER FROM PHENYLHYDRAZINE.

SPECIFICATION forming part of Letters Patent No. 324,630, dated August 18, 1885.

Application filed July 1, 1885. (No specimens.)

*To all whom it may concern:*

Be it known that I, HENRY ZIEGLER, a citizen of Switzerland, residing at Basle, Switzerland, have invented new and useful improvements in the manufacture of a yellow coloring-matter or dye-stuff produced by the action of bioxytartaric acid upon the sulpho-acid of phenylhydrazine, of which the following is a specification.

This invention relates to a yellow dye-stuff or coloring-matter, which is produced by the action of bioxytartaric acid (carboxytartronic acid. See Ke Kulé Ann. Chem. Pharm., vol. 221, page 245,) upon the sulpho-acid of phenylhydrazine, (Fischer Ann. Chem. Pharm., vol. 190, page 76.) This yellow dye-stuff is the representative of a new class of coloring-matters which I have produced by the action of bioxytartaric (carboxytartronic) acid upon several members of the so-called class of "hydrazines," and which shall be made by me the subject-matter of separate applications for Letters Patent.

To carry out my invention I proceed as follows: Ten parts, by weight, of bioxytartrate of soda are intimately mixed with sixteen parts, by weight, of water heated up to 40° centigrade, and then thirteen parts, by weight, of strong hydrochloric acid of 1.18 specific gravity are added. The solution thus obtained is filtered and mixed with twenty parts, by weight, of the before-named sulpho-acid of phenylhydrazine previously dissolved in sixty parts of water and ten parts, by weight, of caustic-soda liquor containing thirty per cent. of solid caustic soda. The mixture is then heated to 80° centigrade during the space of about from one-half to one hour, and afterward refrigerated in order to separate the dye-stuff. The precipitate thus obtained is then filtered, pressed, and dried.

The dye-stuff or coloring-matter prepared as hereinbefore described is the sodium salt of an organic sulpho-acid. It is soluble in cold water, and very easily soluble in hot water. The solutions thus obtained are of a yellow color. In strong alcohol and glacial acetic acid it is almost insoluble even at a boiling-heat. By the addition of caustic soda to the aqueous solution its yellow color assumes a more reddish hue. Alcohol added to the concentrated aqueous solution precipitates the dye-stuff almost completely in the shape of crystalline flakes.

When a solution of nitrate of lead is mixed with the aqueous solution of the dye-stuff, in a few minutes an orange crystalline precipitate is formed. Chloride of baryum under the same conditions produces a reddish orange precipitate. Reducing agents—such as tin and hydrochloric acid, or bichloride of tin and hydrochloric acid, or zinc and acetic acid, or zinc and caustic soda—decolorize the yellow coloring-matter. The dye-stuff dissolves in sulphuric acid with a yellow color.

What I claim as new, and desire to secure by Letters Patent, is—

The yellow dye-stuff or coloring-matter hereinbefore described, and having the characteristics above set forth.

In testimony whereof I have hereunto set my hand in the presence of two subscribing witnesses.

HENRY ZIEGLER.

Witnesses:
 GEORGE GIFFORD,
 CHS. A. RICHTER.